REGULATED VOLTAGE SUPPLIES FOR CATHODE RAY TUBE SYSTEMS
Filed Aug. 31, 1964
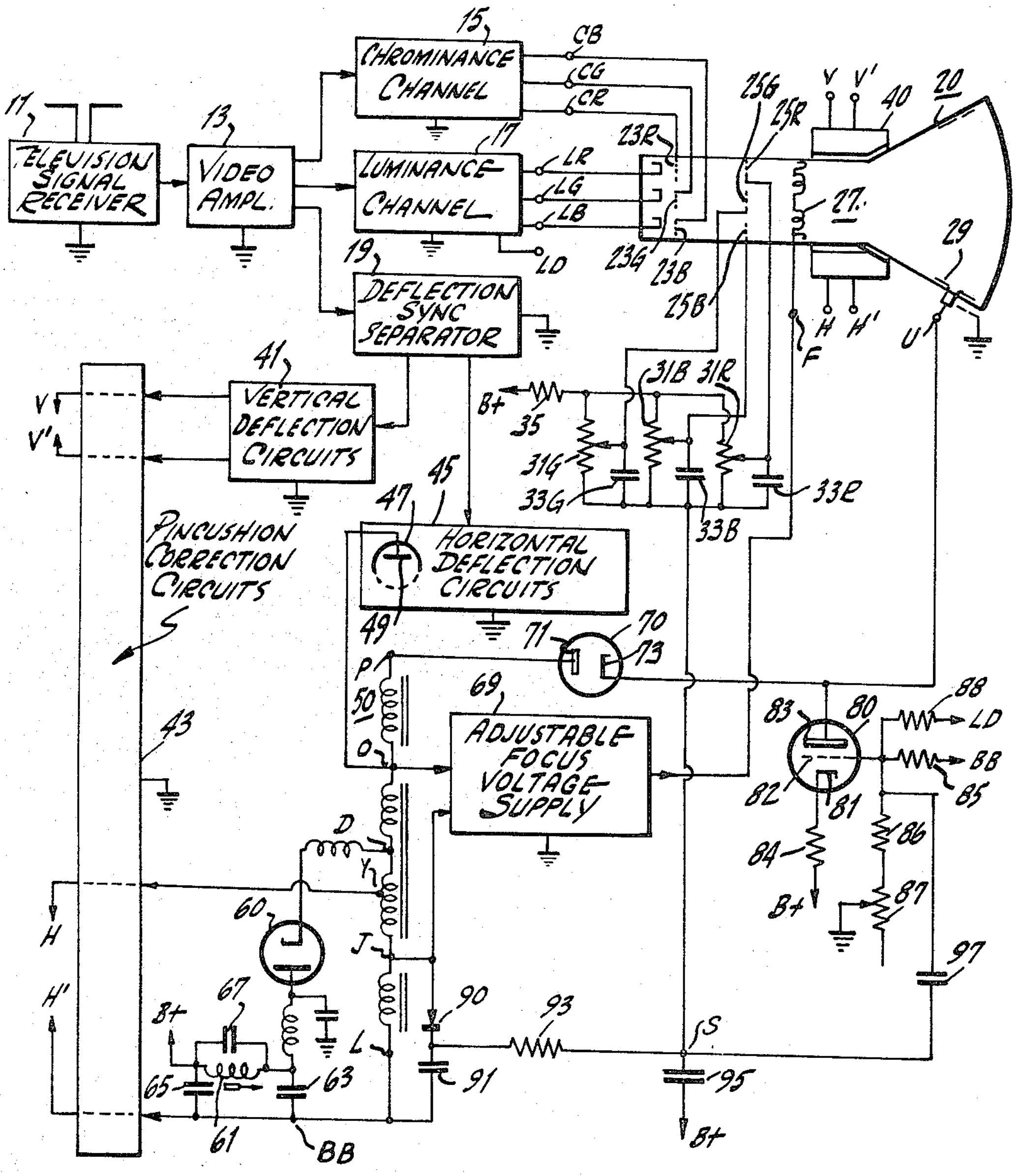
INVENTOR.
JOHN STARK, JR.
BY William H. Meagher
Attorney 3,346,763
Patented Oct. 10, 1967

3,346,763

REGULATED VOLTAGE SUPPLIES FOR CATHODE RAY TUBE SYSTEMS

John Stark, Jr., Indianapolis, Ind., assignor to Radio Corporation of America, a corporation of Delaware Filed Aug. 31, 1964, Ser. No. 393,128
6 Claims. (Cl. 315—22)

ABSTRACT OF THE DISCLOSURE

The D.C. regulator conventionally associated with the ultor voltage supply of a color television receiver is utilized to oppose and thereby minimize undesired field rate variations affecting the receiver's flyback pulse source. Such use of the ultor regulator to attenuate an undesired, low frequency, A.C. component is achieved, in a manner ensuring that the regulator remains desirably insensitive to such components of its D.C. sampling voltage inputs as residual flyback pulse components and video signal frequencies. A source of so-called "boosted boost" voltage is utilized as a control voltage source. A capacitor is used to couple field rate variations appearing in the "boosted boost" supply output to the control grid of the shunt regulator tube in the ultor supply. The field rate variation coupling capacitor—connected effectively in series with a filter capacitor of the "boosted boost" voltage source—inhibits regulator response to residual A.C. components of its D.C. sampling voltage inputs.

The present invention relates generally to regulated voltage supplies, and particularly to regulated voltage supplies of a character appropriate for use in satisfying the high voltage requirements of the color image reproducing device in a color television receiver.

It is a widespread practice, in color television receivers employing a multi-gun, shadow mask, color kinescope as the color image reproducing device, to use a shunt regulator in association with the application of a high unidirectional potential to the kinescope's ultor (final accelerating) electrode. In conventional practice, the regulator comprises a grid-controlled electron discharge device, the space current path of which is connected effectively in parallel with the load presented by the kinescope to the high voltage supply. Variations in ultor voltage due to changes in the kinescope loading on the supply (caused, for example, by changes in the D.C. content of the luminance signal drive) are substantially avoided by controlling the regulator current inversely with respect to the current drawn by the kinescope; i.e., when the kinescope current increases (as due to increased picture brightness) the tendency for the ultor voltage to decrease is opposed by causing the regulator current to decrease, and, conversely, when the kinescope current decreases (as caused by picture darkening) the tendency of the ultor voltage to increase is opposed by causing the regulator current to increase.

A familiar technique for producing the desired change in regulator current involves applying a sample of the receiver's B-boost voltage to the regulator control grid; the desired effect is achieved because the B-boost voltage, derived from the same deflection source as the ultor voltage, responds similarly to changes in loading on the source, and thus reflects the undesired ultor potential variations.

The RCA CTC–15 color television receiver, described in the RCA Service Data pamphlet designated 1963 No. T6, employs a shunt voltage system of the above-described B-boost voltage sampling type. The CTC–15 receiver, however, supplements the B-boost voltage control of the regulator with use of an additional regulator control voltage derived from the luminance channel of the receiver. This supplemental control technique permits the regulator to respond directly to the D.C. component of the luminance signal drive to the kinescope, in addition to the loading-responsive B-boost voltage sample. An effect of the supplemental control is substantial avoidance of the usual ultor voltage "droop" at the minimum regulator current end of the regulation range that arises due to the "error voltage" character of the B-boost sampling approach to regulation.

In the CTC–15 receiver, a .01 microfarad bypass capacitor, connected between the regulator tube grid and cathode, renders the regulator responsive to essentially only the long term D.C. variations of the described control voltages. Such filtering of the control voltages is desirable in order, inter alia, to preclude the regulator from opposing the efforts of the kinescope to display the video frequency variations representative of the picture to be viewed.

The CTC–15 receiver utilizes a color kinescope-yoke combination that has a relatively narrow deflection angle, viz 70°. In receivers employing kinescope-yoke combinations of wider deflection angles, such as 90°, raster distortions of the so-called "pincushion" type assume proportions that merit active correction in receiver operation. It thus appears appropriate in such receivers to provide pincushion correction circuits.

U.S. Patent No. 2,649,555, issued to R. K. Lockhart on Aug. 18, 1953, and U.S. Patent No. 2,842,709, issued to P. M. Lufkin on July 8, 1958, provide examples of techniques that may be employed in such circuits to achieve correction of raster pincushioning. Broadly speaking, correction of pincushioning at the raster sides generally involves some form of modulation of the horizontal deflection field in accordance with a waveform of field rate, while correction of pincushioning at the raster top and bottom generally involves some form of modulation of the vertical deflection field in accordance with a waveform of line deflection rate. A problem associated with the use of this general approach to pincushion correction is introduction of field rate variations into circuits auxiliary to the horizontal deflection system; e.g., the voltage supplies that operate upon a flyback pulse input derived from the horizontal deflection system may be thereby subject to undesired field rate variations of a significant magnitude. Thus, for example, the ultor voltage supplied to the color kinescope may vary at a field rate with consequent, noticeable undesired effects on the reproduced color image.

The present invention is concerned with reducing undesired field rate variations in supply voltages, such as the ultor voltage, that are derived from a receiver's horizontal deflection system.

In accordance with the principles of the present invention, the regulator conventionally associated with the ultor voltage supply of a television receiver is utilized to oppose and thereby minimize undesired field rate variations affecting the receiver's flyback pulse source. Such use of the ultor regulator to attenuate an undesired, low frequency, A.C. component is achieved, pursuant to the invention, in a manner ensuring that the regulator remains desirably insensitive to such components of its D.C. sampling voltage inputs as residual flyback pulse components and the video signal frequencies that desirably affect the receiver's kinescope load in the course of image reproduction.

In accordance with a particular embodiment of the present invention, of marked simplicity, a source of so-called "boosted boost" voltage, associated with the receiver's horizontal deflection transformer for purposes of development of a power supply voltage of augmented amplitude beyond that available from the conventional B-boost supply, is utilized as a control voltage source for the field rate variation regulating arrangement. A capacitor is used to couple field rate variations appearing in the "boosted boost" supply output to the control grid of the shunt regulator tube in the ultor supply. Positive half-cycles of the undesired field rate variation, reflected in a tendency of flyback pulse amplitude (and, accordingly, the amplitude of each associated flyback pulse-rectifying supply output) to increase, causes increased conduction of the regulator tube shunting the ultor supply output to introduce a countervailing increase in loading on the pulse source. Conversely, negative half-cycles of the undesired field rate variation, reflected in a tendency of flyback pulse amplitude to decrease, causes reduced conduction of the shunt regulator tube to introduce a countervailing decrease in loading on the pulse source.

The regulator action reduces field rate variations in the outputs of the ultor supply and other flyback pulse-rectifying supplies to a tolerable level. Illustratively, in one color television receiver utilization, where dynamic side pincushion correction circuitry introduced field rate variations into the horizontal deflection circuits of sufficient magnitude to provide (absent correction) a 16 volt, peak-to-peak, 60 cycle ripple in the boosted-boost supply output (a ripple level causing noticeable, undesired effects in the displayed color picture), use of the described embodiment resulted in a 4 to 1 reduction, down to a tolerable 4 volt level.

Expense attendant the use of the "additional" field rate variation coupling capacitor of the described embodiment may be effectively fully overcome by dispensing with the usual by-pass capacitor, conventionally connected between the regulator tube's control grid and cathode to eliminate regulator response to residual flyback and video frequency components of the D.C. sampling voltages applied to the regulator input circuit. Given an appropriate capacitance value (such as that of the eliminated by-pass capacitor), the field rate variation coupling capacitor—connected effectively in series with a filter capacitor of the "boosted boost" voltage source—maintains the appropriate regulator response inhibition.

A primary object of the present invention is to provide apparatus for attenuating undesired field rate variations in the outputs of voltage supplies associated with a line deflection system. Other objects and advantages of the present invention will be readily recognized by those skilled in the art after a reading of the following detailed description and an inspection of the accompanying drawings which illustrates, partially in block form, and partially in schematic detail, a color television receiver employing a voltage regulating arrangement in accordance with an embodiment of the invention.

In the drawing, a color television receiver is illustrated, which may, for example, be of the general form of the aforementioned RCA CTC–15 color television receiver. Block representations of a number of major segments of the receiver are employed for the purpose of simplifying the drawing; however, pertinent portions of the receiver's horizontal deflection circuitry and associated voltage supplies are illustrated in schematic detail.

The receiver input segment, represented by the block 11, labeled television signal receiver, selects a radiated color television signal, converts the selected modulated RF signal to intermediate frequencies, amplifies the resultant modulated IF signal, and, by detection of the IF signal, recovers a composite color video signal; i.e., it may comprise the usual lineup of tuner, IF amplifier and video detector. The composite color video signal output of receiver 11 is supplied to a video amplifier 13, from which is derived inputs for the receiver's chrominance channel 15, luminance channel 17, and deflection sync separator 19.

The chrominance channel 15, shown only in block form may comprise the usual circuitry associated with proper recovery of color-difference signal information from the modulated color subcarrier which is a component of the composite color video signal output of video amplifier 13. Such circuitry generally comprises a bandpass amplifier for selectively amplifying the color subcarrier bands, a suitable array of synchronous detectors for demodulating the color subcarrier and matrix circuits for suitably combining the detector outputs to obtain a set of color-difference signals of the appropriate form for application to the receiver's color image reproducer. To effect the desired synchronous detection of the modulated color subcarrier, there will be associated with the chrominance channel detectors a local source of oscillations of subcarrier frequency and reference phase, as well as means for phase synchronizing this local oscillation source in accordance with the reference information of the burst component of the composite color video signal.

The red, blue and green color-difference signal outputs of the chrominance channel 15 appear at respective output terminals CR, CB and CG, which are directly connected to the respective control grids, 23R, 23B and 23G, of the red, blue and green electron guns of a color kinescope 20, which is of the well-known tri-gun, shadow-mask type.

This color-difference signal drive of color kinescope 20 is complemented by the application of luminance information to the respective cathodes 21R, 21B and 21G of color kinescope 20. Luminance channel 17, which may, in its usual form, comprise suitable wideband amplifier means for amplifying the luminance signal component of the composite color video signal processed by video amplifier 13, develops luminance signal outputs at respective output terminals LR, LB and LG for direct application to the respective kinescope cathodes 21R, 21B and 21G. Desirably, the luminance channel 17 may include means for adjusting the relative amplitudes of the luminance signal outputs appearing at the respective output terminals, LR, LB and LG, for color balance purposes. A luminance signal output also appears at an additional luminance channel output terminal LD, for use in a regulator control arrangement to be subsequently described.

The color kinescope 20 additionally includes: individual screen grid electrodes 25R, 25B and 25G for the respective red, blue and green electron guns, each screen grid electrode being supplied with an individually adjustable operating D.C. potential; focusing electrode structure 27 for the electron gun trio, subject to common energization via the output treminal F of an adjustable D.C. source; and ultor (final accelerating) electrode structure 29, adapted to operate at a high voltage, supplied thereto via the output terminal U of a regulated high voltage supply. The voltage supplies for the aforesaid kinescope electrodes are associated with the receiver's deflection circuitry in a manner to be explained in detail subsequently.

Associated with the color kinescope 20 is a deflection yoke 40 for developing magnetic beam deflection fields within the kinescope to cause the kinescope beams to trace a scanning raster on the kinescope's viewing screen. The deflection yoke 40 incorporates respective horizontal (H, H′) and vertical (V, V′) deflection windings, which, upon energization with deflection currents of appropriate frequencies and waveshapes, will provide the respective line and field rate deflections of the kinescope beams desired for raster development.

The deflection sync separator 19, in response to an output of video amplifier 13, separates the deflection synchronizing components from the remainder of the received composite color video signal. The sync separator 19 supplies a vertical sync pulse output to the vertical deflection circuits 41 and a horizontal sync pulse output to the horizontal deflection circuits 45.

Under suitable control of the applied synchronizing pulses, the vertical deflection circuits 41 generate an appropriately shaped and timed field rate scanning current wave for application to the vertical deflection windings V, V′ of yoke 40. The horizontal deflection circuits 45 perform a comparable function with regard to a line rate scanning current wave for energizing the horizontal windings H, H' of yoke 40. However, the output circuit elements associated with the driving device for the horizontal yoke windings should be considered in detail at this point, since the voltage supplies with which the present invention is concerned are associated therewith.

The horizontal output tube 47 (partially illustrated) has its output electrode, anode 49, connected to an intermediate terminal 0 of the horizontal output transformer 50, which provides step-down autotransformer coupling to the horizontal deflection winding H, H' of yoke 40. The transformer winding segment extending from the intermediate terminal 0 to the end terminal L constitutes the primary winding for the step-down autotransformer coupling, with a portion of this winding segment, extending between an intermediate tap Y and the end terminal L, serving as the secondary across which the yoke winding is to be coupled.

A damper tube circuit is provided for conventional reaction scanning and power recovery purposes. The cathode of a damper diode 60 is connected (via an RF choke) to a transformer tap D, positioned intermediate the drive input terminal 0 and the yoke-connecting tap Y. The anode of damper diode 60 is connected to the receiver's B+ voltage supply (not illustrated) by a direct current conductive path including an additional RF choke in series with a variable inductor 61, the latter serving a familiar linearity or efficiency adjustment purpose. The adjustable inductor 61 is shunted by a capacitor 67, and the respective end terminals of the adjustable inductor 61 are coupled by respective capacitors 63 and 65 to a common terminal BB (directly connected to the end terminal L of transformer 50). Periodic conduction by diode 60 develops a charge across capacitors 63 and 65, resulting in the development at terminal BB of a D.C. potential of augmented amplitude relative to B+, i.e., the so-called B-boost potential. In addition to serving as the effective anode potential for the horizontal output tube 47, the B-boost potential is also available for use for other purposes, as will be discussed subsequently.

During each of the recurring retrace intervals of the scanning waves delivered to the horizontal yoke windings, a so-called flyback voltage pulse is developed across the windings of transformer 50 due to sudden cutoff of output tube 47. These flyback pulses are subject to rectification for various voltage supply purposes associated with the operation of color kinescope 20. One such flyback pulse use is involved in the development of an energizing potential for the ultor electrode 29. Diode 70 serves as the flyback pulse rectifier for the development of the high voltage required by the ultor electrode 29. A stepped-up version of the flyback pulse appearing across the O–L primary winding of transformer 50 is supplied as an input to the anode 71 of the ultor rectifier 70. Anode 71 is connected to the high potential end terminal P of transformer 50, with the full P–L winding serving as a step-up autotransformer secondary for these purposes.

The development of an energizing potential for the focusing electrode structure 27 of color kinescope 20 is also based on flyback pulse rectification. For such purposes, an adjustable focus voltage supply 61 (shown only in block form) is provided, with input thereto derived from transformer 50, and output therefrom delivered to the focus electrode energizing terminal F. While a variety of structures are available for focus voltage supply use, a particularly advantageous form is that disclosed in U.S. Patent 3,113,237, issued on Dec. 3, 1963, to J. C. Schopp and L. E. Annus. In the structure shown in the Schopp, et al. patent, two inputs for the focus supply are derived from the associated horizontal output transformer, one being a flyback pulse input of relatively large magnitude (of the order of the potentials in the desired D.C. focus potential range), and the other being flyback pulse input of considerably smaller magnitude (e.g., equal in amplitude to a fraction of the width of the desired focus potential range). For operation of the focus supply 61 of the drawing herein pursuant to the Schopp, et al., patent arrangement, a high potential flyback pulse input is derived from terminal 0 of transformer 50, while a relatively low potential flyback pulse input is derived from a transformer tap J, located on transformer 50 between the yoke driving terminals Y and L.

An additional voltage supply associated with the output transformer 50 involves development of so-called "boosted-boost" potential. Such a "boosted-boost" voltage supply is provided in the aforementioned CTC–15 receiver, and used therein for the energization, inter alia, of the color kinescope screen grid electrodes. In the boosted-boost circuit of the drawing herein, the anode of a diode 90 is connected to the aforementioned transformer tap J, while its cathode is coupled via a filter capacitor 91 to the transformer end terminal L. The periodic conduction of diode 90, in response to flyback pulse occurrences, develops a charge across capacitor 91 that effectively adds to the D.C. potential available at the end terminal L (i.e., that adds to the B-boost potential). The D.C. potential at the junction of diode 90 and capacitor 91 is thus of augmented amplitude relative to the B-boost potential, and is accordingly referred to as a boosted-boost potential. A resistor 93 is connected in series with a filter capacitor 95, in the order named, between the diode 90-capacitor 91 junction and a point of B+ potential. The values of resistor 93 and capacitor 95 are suitably chosen so that the potential at their junction S is relatively free of line frequency ripple; the voltage level at S is somewhat less than that at the cathode of diode 90 due to voltage dropping action of resistor 93.

The filtered boosted-boost potential at junction S is used in the energization of the kinescope screen grid electrodes 25R, 25G and 25B. Each of the screen grid electrodes is connected to a respective one of the adjustable taps of a trio of potentiometers 31R, 31G and 31B. A dropping resistor 35 is connected between a point of B+ potential and a fixed end terminal of each of the three potentiometers; the remaining fixed end terminals of the three potentiometers are jointly connected to junction S. Adjustment of the taps allows individual selection of the respective screen grid potentials in a range intermediate the receiver's B+ potential and the potential of the boosted-boost rectifier output, the precise bounds of the range being determined by the relative values of the resistors 35 and 93, and the net resistance presented by the parallel potentiometer resistances.

The voltage supply serving to energize the ultor electrode 29 is subject to severe loading variations in the course of the normal operation of the receiver. The load represented by the color kinescope 20 varies widely in accordance with the D.C. content of the luminance signal drive thereof. For proper operation of the color kinescope, however, wide variations in the voltage at ultor electrode 29 cannot be tolerated. Accordingly, it is conventional practice to provide means for dynamically regulating the ultor potential. For this purpose, a regulator tube 80 is provided, with its space current path effectively shunted across the variable kinescope load. Such shunt relationship is established in the circuit of the drawing by connection of the regulator tube anode 83 to the ultor terminal U, and by return of the regulator tube cathode 81 (via resistor 84) to a point of B+ potential.

The desired operation for regulator involves its use as a load on the ultor voltage supply that varies concomitantly with variations in the kinescope load, but in an opposing sense. In other words, it is desired that any decrease in kinescope current (such as may be caused by a darkening of the displayed picture) is accompanied by a corresponding increase in regulator current. Conversely, the regulator current should decrease to offset an increase in kinescope current (such as may be caused by brightening of the displayed picture).

The B-boost voltage available at terminal BB is sensitive to variations in the loading on transformer 50, and its level will accordingly vary as the kinescope load varies. Thus a suitable control of the regulator tube 80 may be approached by applying a sample of the B-boost voltage to the regulator tube control grid 82. In the circuit of the drawing, a voltage divider is connected between terminal BB and chassis ground, and control grid 82 connected to a tapping point on this voltage divider, for such regulator control purposes. The B-boost voltage sampling divider specifically includes a fixed resistor 85, a fixed resistor 86 and a variable resistor 87, connected in series in the order named between terminal BB and chassis ground; control grid 82 is connected to the junction of the fixed resistors 85 and 86 of the voltage divider.

The above-described control of regulator tube 80 by a B-boost voltage sampling technique is supplemented in the illustrated circuit by application to control grid 82 of an additional D.C. control voltage. Specifically, the supplemental D.C. control involves use of the D.C. component of the luminance signal driving the color kinescope cathodes. As previously noted, a luminance signal output of luminance channel 17 is available at an output terminal LD for regulator control purposes. Resistor 88 provides a direct current conductive connection between terminal LD and the regulator tube control grid 82. Resistor 88, in combination with the previously mentioned fixed resistor 86 and variable resistor 87, thus provides a luminance signal voltage divider, applying a sample of the luminance signal to the control grid 82. Variable resistor 87 provides means for conjointly adjusting the precise amplitudes of the two control voltage samples at control grid 82.

As thus far described, the regulator control arrangement parallels that of the previously mentioned CTC–15 receiver. An element of that receiver's arrangement that is, however, omitted in the circuit of the drawing is the bypass capacitor conventionally connected directly between control grid and cathode of the regulator tube. In its stead is a capacitor 97, coupled directly between the regulator control grid 82 and junction S in the previously described boosted boost circuit.

The function otherwise performed by the omitted capacitor, viz., inhibiting the response of regulator 80 to A.C. components of the control voltage sample (i.e., such as flyback pulse remnants in the B-boost sample, and the video frequencies of the A.C. component of the luminance signal sample), continues to be served by the added capacitor 97. With appropriate capacitance values, the series combination of capacitor 97 and boosted-boost plings of scanning currents to the respective windings of yoke 40.

The nature of pincushion raster distortion, and its likely presence when a color kinescope of a wide-angle type is used, have been previously discussed herein. Also previously noted is the usual character of circuits for the correction of pincushion distortion: their principles of operation involve interaction between the vertical and horizontal deflection circuits.

An appropriate example is a saturable reactor arrangement for side pincushion correction shown in FIG. 2 of the Lufkin Patent, No. 2,842,709. There, the variable impedance winding of a saturable reactor is connected as a series element in the path of the line rate scanning current traversing the horizontal deflection windings of a yoke; the control winding of the saturable reactor is traversed by a current varying in accordance with a field rate waveform of parabolic shape. The peak-to-peak amplitude of the line rate scanning current wave is thereby modulated at a field rate, with a modulation envelope of appropriate parabolic shape. The resultant compression of raster width at picture top and bottom relative to picture middle may thus compensate for the raster side bowing that constitutes the side pincushion distortion sought to be corrected.

The described dynamic width modulation has a side effect, however, that is pertinent to the present analysis: the circuit traversed by the modulated line rate scanning current appears to the driving transformer as a load that recurringly varies at a field rate. As a consequence, the flyback pulse outputs of the transformer that are applied as inputs to associated voltage supplies are subject to amplitude variations reflecting the field rate changes in loading on the transformer.

In a color television receiver with voltage supply arrangements of the general character previously described, the potentially adverse effects of such field rate variations in flyback pulse amplitude are several. For example, translation of the pulse amplitude variations into ultor potential variations can adversely affect operation of the color kinescope 20 in such critical areas as dynamic beam convergence. Moreover, such ultor potential variations can adversely affect the efficiency of the pincushion correction effort itself by re-inforcing the distortion, rather than opposing it. Additionally, translation of the pulse amplitude variations into screen grid potential variations can produce annoying shading or banding effects in the displayed picture, e.g., darkening of the picture at the top and bottom relative to picture middle.

A substantial minimization of such adverse effects is

It should be noted that, while pincushion correction circuits are one likely source of undesired field rate variations that the present invention will serve to minimize, the benefits of the invention extend to the elimination of such potential variations however introduced. Thus, for example, use of the invention will stabilize the ultor potential supply and other flyback pulse based potential supplies against variations of field rate order caused by kinescope loading variations in response to field rate components of the luminance signal drive. It has also been observed that the use of the present invention reduces high voltage transients caused by sudden scene changes (as produced, for example, by the switching between cameras). Thus, it should be appreciated that advantageous use of the present invention is not solely limited to receivers employing pincushion correction circuits.

Circuitry in accordance with the present invention has been successfully employed in a color television receiver employing a wide-angle color kinescope together with pincushion correction circuitry of a saturable reactor type. Although the pincushion correction circuits in said receiver took an improved form, relative to the discussed Lufkin circuit, incorporating provisions tending to reduce variations of the transformer loading, there remained residual effects on the transformer loading of sufficient magnitude to adversely affect receiver operation in the various manners previously described; use of the present invention, however, afforded a reduction of these residual variations by a factor of the order of four to one. A set of values for the pertinent circuit elements of the drawing, that proved satisfactory in such use, are set forth below, by way of example only:

| | |
|---|---|
| Resistor **84** | 1000 ohms. |
| Resistor **85** | 1.5 megohm. |
| Resistor **86** | 1.5 megohm, shunted by 12 megohms. |
| Resistor **87** | 500,000 ohms. |
| Resistor **88** | 12 megohms. |
| Resistor **93** | 100,000 ohms. |
| Capacitor **91** | .0022 microfarad. |
| Capacitor **95** | .01 microfarad. |
| Capacitor **97** | .01 microfarad. |
| Diode **70** | Selenium (stack) rectifier 800 P.I.V. |
| Triode **80** | 6BK4A. |
| Diode **90** | 3A3. |

What is claimed is:

1. In a cathode ray tube system involving development of display rasters comprising recurring fields of scanning lines, said system including a cathode ray tube and respective line and field rate cathode ray beam deflection circuits, said cathode ray tube including an ultor electrode and additional electrodes, the operating potentials for said ultor electrode and at least one of said additional electrodes being derived in respective supply circuits at least in part via rectification of flyback pulses generated in said line rate deflection circuit, said system being subject to the appearance of undesired field rate variations in parameters of said line rate deflection circuit, reflection of said field rate variations in said operating potentials tending to adversely affect operation of said cathode ray tube; a voltage regulating arrangement comprising in combination:

a regulating device having a control electrode, said regulating device being connected to said ultor electrode and serving as a controllable load on said ultor operating potential supply circuit;

a source of control voltage sensitive to variations in the load presented by said cathode ray tube to said ultor operating potential supply circuit;

means providing a direct current conductive coupling between said control voltage source and said regulating device control electrode for causing said regulating device to oppose long term D.C. variations in said ultor potential caused by said cathode ray tube load variations;

and means providing an exclusively alternating current coupling between the operating potential supply circuit for said additional electrode and said regulating device control electrode for causing said regulating device to oppose undesired field rate variations in said ultor potential.

2. In a cathode ray tube system including a cathode ray tube having an ultor electrode, respective line and field rate cathode ray beam deflection circuits, and a supply circuit for deriving an operating potential for said ultor electrode via rectification of flyback pulses generated in said line deflection circuit, said system being subject to the appearance of undesired field rate variations in said line rate deflection circuit, reflection of said field rate variations in said ultor operating potential tending to adversely affect the operation of said cathode ray tube; a voltage regulating arrangement comprising the combination of:

a regulating device having a control electrode, said regulating device being connected to said ultor electrode and serving as a controllable load on said ultor operating potential supply circuit;

a source of control voltage sensitive to variations in the load presented by said cathode ray tube to said ultor operating potential supply circuit;

means providing a direct current conductive coupling between said control voltage source and said regulating device control electrode for causing said regulating device to oppose long term D.C. variations in said ultor potential caused by said cathode ray tube load variations;

means responsive to said undesired field rate variations appearing in said line rate deflection circuit, and coupled to said regulating device control electrode, for causing said regulating device to oppose field rate variations reflected in said ultor operating potential;

said last named means additionally serving, in conjunction with said direct current conductive coupling providing means, to inhibit response by said regulating device to short term A.C. components of said control voltage.

3. In a cathode ray tube system including a cathode ray tube having an ultor electrode, respective line and field rate cathode ray beam deflection circuits, and a supply circuit for deriving an operating potential for said ultor electrode via rectification of flyback pulses generated in said line deflection circuit, said system being subject to the appearance of undesired field rate variations in said line rate deflection circuit, reflection of said field rate variations in said ultor operating potential tending to adversely affect the operation of said cathode ray tube; a voltage regulating arrangement comprising the combination of:

a regulating device having a control electrode, said regulating device being connected to said ultor electrode and serving as a controllable load on said ultor operating potential supply circuit;

a source of control voltage sensitive to variations in the load presented by said cathode ray tube to said ultor operating potential supply circuit;

means providing a direct current conductive coupling between said control voltage source and said regulating device control electrode for causing said regulating device to oppose long term D.C. variations in said ultor potential caused by said cathode ray tube load variations;

a source of D.C. voltage substantially free of A.C. components of line frequency and higher, but subject to said undesired field rate variations;

means, including a capacitor coupled between said D.C. voltage source and said regulating device control electrode, for causing said regulating device to oppose field rate variations reflected in said ultor operating potential;

said capacitor being so disposed relative to said direct current conductive coupling providing means, and its reactance values being so proportioned relative to the impedance of said direct current conductive coupling providing means, that relatively short term A.C. components of said control voltage appear only with severely attenuated amplitude at said control electrode.

4. In a television receiver including a kinescope having an ultor electrode, respective horizontal and vertical deflection circuits, a source of B-boost voltage derived from said horizontal deflection circuit, a supply circuit for deriving an operating potential for said ultor electrode via rectification of flyback pulses generated in said horizontal deflection circuit, said receiver being subject to the appearance of undesired vertical frequency variations in the amplitude of said flyback pulses, reflection of said vertical frequency variations in said ultor electrode operating potential tending to adversely affect operation of said kinescope; a voltage regulating arrangement comprising in combination:

a regulating device having a control electrode, said regulating device being connected to said ultor electrode and serving as a controllable load on said ultor operating potential supply circuit;

a source of boosted boost potential including means for developing a D.C. voltage component by rectification of said flyback pulses, said boosted boost potential constituting said B-boost voltage augmented by said D.C. voltage component and reflecting said undesired vertical frequency variations;

means providing a direct current conductive coupling between said B-boost voltage source and said regulating device control electrode for causing said regulating device to oppose long term D.C. variations in said ultor potential;

and capacitive means coupled between said source of boosted boost potential and said regulating device control electrode for causing said regulating device to oppose said undesired vertical frequency variations in said ultor potential.

5. In a color television receiver including a color kinescope having an ultor electrode, respective horizontal and vertical deflection circuits, a source of B-boost voltage associated with said horizontal deflection circuit, a supply circuit for deriving an operating potential for said ultor electrode by means of rectification of flyback pulses developed in said horizontal deflection circuit, said receiver being subject to the appearance of undesired vertical frequency variations in the amplitude of said flyback pulses, reflection of said vertical frequency variations in said ultor electrode operating potential tending to adversely affect operation of said color kinescope, the combination comprising:

a regulator tube having a control electrode, said regulator tube being connected to said ultor electrode and serving as a controllable load on said ultor electrode operating potential supply circuit;

a source of boosted boost potential, said source including means for developing a D.C. voltage component by rectification of said flyback pulses, said boosted boost potential constituting said B-boost voltage augmented by said D.C. voltage component and reflecting said undesired vertical frequency variations in the amplitude of said flyback pulses;

means providing a direct current conductive coupling between said B-boost voltage source and said regulator tube control electrode for causing said regulator tube to oppose long term D.C. variations in said ultor operating potential;

and means providing an exclusively alternating current coupling between said boosted boost potential source and said regulator tube control electrode for causing said regulator tube to oppose said undesired vertical frequency variations in said ultor operating potential.

6. In a color television receiver including a color kinescope having an ultor electrode and a screen grid electrode, respective horizontal and vertical deflection circuits, a source of B-boost voltage associated with said horizontal deflection circuit, a supply circuit for deriving an operating potential for said ultor electrode by means of rectification of flyback pulses developed in said horizontal deflection circuit, said receiver being subject to the appearance of undesired vertical frequency variations in the amplitude of said flyback pulses, reflection of said vertical frequnecy variations in said ultor electrode operating potential tending to adversely affect operation of said color kinescope, the combination comprising:

a regulator tube having a control grid, said regulator tube being connected to said ultor electrode and serving as a controllable load on said ultor electrode operating potential supply circuit;

a source of boosted boost potential, said source including means for developing a D.C. voltage component by rectification of said flyback pulses, said boosted boost potential constituting said B-boost voltage augmented by said D.C. voltage components and reflecting said undesired vertical frequency variations in the amplitude of said flyback pulses;

means, including a filter capacitor, for deriving an operating potential for said kinescope screen grid electrode from said source of boosted boost voltage;

means, including a resistor serially connected between said B-boost voltage source and said regulator tube control grid, for causing said regulator tube to oppose relatively long term D.C. variations in said ultor operating potential;

means, including a coupling capacitor connected between said boosted boost potential source and said regulator tube control grid, for causing said regulator tube to oppose said undersired vertical frequency variations reflected in said ultor operating potential;

said coupling capacitor and said filter capacitor forming a series combination connected between said regulator tube control grid and a point of A.C. ground potential, the capacitance value of said series combination being so related to the resistance value of said resistor that response by said regulator tube to relatively short term A.C. components of said B-boost voltage is strongly inhibited.

References Cited

General Electric Color Television Bulletin Cy3–25. Received Aug. 8, 1963.

JOHN W. CALDWELL, *Acting Primary Examiner.*

R. K. ECKERT, *Assistant Examiner.*